(12) United States Patent
Cheng et al.

(10) Patent No.: US 10,732,152 B2
(45) Date of Patent: Aug. 4, 2020

(54) DEVICE AND METHOD FOR MONITORING HEALTHY STATUS OF MACHINERY MOUNTS

(71) Applicant: National Chung Cheng University, Chia-yi County (TW)

(72) Inventors: Chih-Chun Cheng, Tainan (TW); Ping-Chun Tsai, Taipei (TW); Wen-Nan Cheng, Tainan (TW); Zhen-Wei Zhuang, Taichung (TW); Yu-Hsin Kuo, Taichung (TW); Zhi-Xuan Zhang, Taichung (TW); Yu-Sheng Chiu, Changhua County (TW); Ren-Zh Lu, Changhua County (TW)

(73) Assignee: NATIONAL CHUNG CHENG UNIVERSITY, Chia-Yi County (TW)

( * ) Notice: Subject to any disclaimer, the term of this patent is extended or adjusted under 35 U.S.C. 154(b) by 256 days.

(21) Appl. No.: 15/878,456

(22) Filed: Jan. 24, 2018

(65) Prior Publication Data

US 2019/0162704 A1    May 30, 2019

(30) Foreign Application Priority Data

Nov. 30, 2017   (TW) .............................. 106141933 A

(51) Int. Cl.
*G01N 29/44*      (2006.01)
*G01N 29/46*      (2006.01)
(Continued)

(52) U.S. Cl.
CPC ......... *G01N 29/4427* (2013.01); *G01N 29/12* (2013.01); *G01N 29/14* (2013.01);
(Continued)

(58) Field of Classification Search
CPC ........ G01N 29/46; G01N 29/12; G01N 29/14; G01N 29/4436; G01N 2291/0258; G01N 29/4427
See application file for complete search history.

(56) References Cited

U.S. PATENT DOCUMENTS 6,053,047 A * 4/2000  Dister ................. G01M 13/028
                                                73/593
2003/0025255 A1  2/2003  Gade et al.
(Continued)

FOREIGN PATENT DOCUMENTS

TW          201230731          7/2012

OTHER PUBLICATIONS

T. D. Tsai . C. C. Cheng "Structural design for desired eigenfrequencies and mode shapes using topology optimization", in Structural and Multidisciplinary Optimization May 2013,DOI: 10. 1007/s00158-012-0840-2, Published on line: Sep. 4, 2012.
(Continued)

*Primary Examiner* — Mohamed Charioui
(74) *Attorney, Agent, or Firm* — WPAT, PC

(57) ABSTRACT

A device for monitoring healthy status of machinery mounts is provided, which may include a plurality of vibration detectors, a signal acquisition device and a signal processor. The vibration detectors may detect the vibration signals from of a machine device, where the machine device may include a plurality of machinery mounts. The signal acquisition device may receive the vibration signals of the vibration detectors. The signal processor may execute a modal frequency analysis process to analyze the vibration signals of the vibration detectors, and calculate a vibration mode corresponding to the natural frequency of the machinery mounts in current status to serve as the test mode; then, the signal processor may compare the test mode with a reference mode to determine the healthy status of the machinery
(Continued)

mounts, where the reference mode is corresponding to the natural frequency of the machinery mounts in the optimized status.

18 Claims, 11 Drawing Sheets

(51) Int. Cl.
*G01N 29/12* (2006.01)
*G01N 29/14* (2006.01)

(52) U.S. Cl.
CPC ......... *G01N 29/4436* (2013.01); *G01N 29/46* (2013.01); *G01N 2291/023* (2013.01); *G01N 2291/0258* (2013.01)

(56) References Cited

U.S. PATENT DOCUMENTS

| | | | |
|---|---|---|---|
| 2010/0085205 A1* | 4/2010 | Tompkins | G01M 13/04 340/682 |
| 2015/0032392 A1* | 1/2015 | Bradley | G01H 17/00 702/56 |
| 2016/0370259 A1* | 12/2016 | Loverich | G01M 13/00 |
| 2018/0196014 A1* | 7/2018 | Mann, III | G01N 29/4418 |

OTHER PUBLICATIONS

Taiwan Intellectual Property Office, "Office Action", dated Aug. 9, 2018.

\* cited by examiner

DEVICE AND METHOD FOR MONITORING HEALTHY STATUS OF MACHINERY MOUNTS

CROSS REFERENCE TO RELATED APPLICATION

All related applications are incorporated by reference. The present application is based on, and claims priority from, Taiwan Application Serial Number 106141933, filed on Nov. 30, 2017, the disclosure of which is hereby incorporated by reference herein in its entirety.

TECHNICAL FIELD

The technical field relates to a technology for improving the performance of a machine, in particular to a device for monitoring healthy status of machinery mounts. The technical field further relates to the method of the device for monitoring healthy status of machinery mounts.

BACKGROUND

With the development of the machine industry, the precision of machine devices is required to be higher. A machine device, such as a machine tool, usually has several machinery mounts contacting the ground in order to support the machine device. The manufacturer of the machine device provides several types of machinery mounts with different structures for customers according to their requirements so as to isolate the vibrations between the machine device and the ground, and adjust the levelness of the machine device.

In general, when adjusting the levelness of the machine device, the user should install a leveling instrument on the work table of the machine device. Then, the user can adjust the height of the machinery mounts to calibrate the levelness of the machine device in order to make the levelness of the machine device conform to the levelness standard value.

However, the user cannot determine whether the joint stiffness between the machinery mounts and the ground is sufficient even if the levelness of the machine device conforms to the levelness standard value. Once the joint stiffness between the ground and any one of the machinery mounts is insufficient, abnormal vibrations may be incurred during the machining process of the machine device, which will decrease the precision of the finished products.

Therefore, it has become an important issue to provide a technology for monitoring the health status of machinery mounts in order to effectively overcome the problem that the joint stiffness between the machinery mounts of a machine device and the ground may be insufficient.

SUMMARY

An embodiment of the present disclosure relates to a device for monitoring healthy status of machinery mounts is provided, which may include a plurality of vibration detectors, a signal acquisition device and a signal processor. The vibration detectors may detect the vibration signals from a machine device, where the machine device may include a plurality of machinery mounts. The signal acquisition device may receive the vibration signals of the vibration detectors. The signal processor may execute a modal frequency analysis process to analyze the vibration signals of the vibration detectors, and calculate a vibration mode corresponding to the natural frequency of the machinery mounts in current status to serve as the test mode; then, the signal processor may compare the test mode with a reference mode to determine the healthy status of the machinery mounts, where the reference mode is corresponding to the natural frequency of the machinery mounts in the optimized status.

In a preferred embodiment, the healthy status of the machinery mounts may stand for the joint stiffness between the machinery mounts and the ground.

In a preferred embodiment, the vibration detectors may detect the vibration signals from the machine device after the machine device is excited.

In a preferred embodiment, the vibration detectors may be accelerometers, or other similar devices.

In a preferred embodiment, the signal processor may execute a transmissibility calculation process in order to calculate the transmissibility of the vibration detectors.

In a preferred embodiment, the signal processor may calculate the transmissibility of the vibration detectors according to the vibration signals of the vibration detectors.

In a preferred embodiment, the signal processor may execute a power spectrum density function analysis process to calculate the ratio between the vibration signals of the vibration detectors in order to obtain the transmissibility of the vibration detectors.

In a preferred embodiment, the signal processor may execute a singular value decomposition process to calculate the singular value of the transmissibility matrix composed of the transmissibilities of the vibration detectors in order calculate the natural frequency of the machinery mounts in the current status according to the singular value.

In a preferred embodiment, the signal processor may execute a status diagnosis process in order to calculate the modal assurance criterion between the reference mode and the test mode.

In a preferred embodiment, when the modal assurance criterion is higher than a threshold, the signal processor may determine that the machine mounts are in the optimized status.

In a preferred embodiment, when the modal assurance criterion is lower than a threshold, the signal processor may determine that the machine mounts are not in the optimized status.

Another embodiment of the present disclosure relates to a method for monitoring healthy status of machinery mounts, which may include the following steps: detecting a plurality of vibration detectors vibration signals from a machine device having a plurality of machinery mounts; receiving the vibration signals of the vibration detectors; executing a modal frequency analysis process to analyze the vibration signals of the vibration detectors to calculate a vibration mode corresponding to the natural frequency of the machinery mounts to serve as a test mode; and comparing the test mode with a reference mode corresponding to the natural frequency of the machinery mounts in the optimized status in order to determine the healthy status of the machinery mounts.

In a preferred embodiment, the healthy status of the machinery mounts may stand for the joint stiffness between the machinery mounts and the ground.

In a preferred embodiment, the step of detecting the vibration signals from the machine device by the vibration detectors may further include the following step: exciting the machine device.

In a preferred embodiment, the step of executing the modal frequency analysis process to analyze the vibration signals of the vibration detectors to calculate the vibration mode corresponding to the natural frequency of the machinery mounts to serve as the test mode may further include the following step: executing a transmissibility calculation process in order to calculate the transmissibility of the vibration detectors.

In a preferred embodiment, the step of executing the modal frequency analysis process to analyze the vibration signals of the vibration detectors to calculate the vibration mode corresponding to the natural frequency of the machinery mounts to serve as the test mode may further include the following step: executing a singular value decomposition process to calculate the singular value of the transmissibility matrix composed of the transmissibilities of the vibration detectors in order to calculate the natural frequency of the machinery mounts in the current status according to the singular value.

In a preferred embodiment, the step of comparing the test mode with the reference mode corresponding to the natural frequency of the machinery mounts in the optimized status in order to determine the healthy status of the machinery mounts may further include the following step: executing a status diagnosis process to calculate the modal assurance criterion between the reference mode and the test mode.

In a preferred embodiment, the step of comparing the test mode with the reference mode corresponding to the natural frequency of the machinery mounts in the optimized status in order to determine the healthy status of the machinery mounts may further include the following step: determining that the machine mounts are in the optimized status when the modal assurance criterion is higher than a threshold.

In a preferred embodiment, the step of comparing the test mode with the reference mode corresponding to the natural frequency of the machinery mounts in the optimized status in order to determine the healthy status of the machinery mounts may further include the following step: determining that the machine mounts are not in the optimized status when the modal assurance criterion is lower than the threshold.

The method and the device for monitoring healthy status of machinery mounts according to the embodiments of the present disclosure may have the following advantages:

(1) According to one embodiment of the present disclosure, the device for monitoring healthy status of machinery mounts can execute the modal frequency analysis process to determine the healthy status of the machinery mounts of the machine device, so can effectively monitor whether the joint stiffness between each machinery mount and the ground is enough to support the machine device. Thus, the device for monitoring healthy status of machinery mounts can effective prevent from the abnormal vibrations generated during the machining process of the machine device, so the precision of the machine device can be significantly increased.

(2) According to one embodiment of the present disclosure, the device for monitoring healthy status of machinery mounts can detect the vibration signals from the machine device after the machine is excited, so the vibration signals can be more precise. Therefore, the device for monitoring healthy status of machinery mounts can precisely estimate the change of modes of the machinery mounts, which can significantly increase its precision.

(3) According to one embodiment of the present disclosure, the device for monitoring healthy status of machinery mounts can swiftly determine the healthy status of the machinery mounts, so the user can efficiently adjust or replace the machinery mounts of the machine device, which is more conveniently in use.

(4) According to one embodiment of the present disclosure, the device for monitoring healthy status of machinery mounts can monitor not only the healthy status of the machinery mounts of the machine tool, but also can monitor the healthy status of the machinery mounts of the other kinds of machines, so its application can be more comprehensive.

(5) According to one embodiment of the present disclosure, the device for monitoring healthy status of machinery mounts can be directly integrated with the machine device, so the machine device can provide the function for monitoring the healthy status. Therefore, the commercial value of the machine device can be increased.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
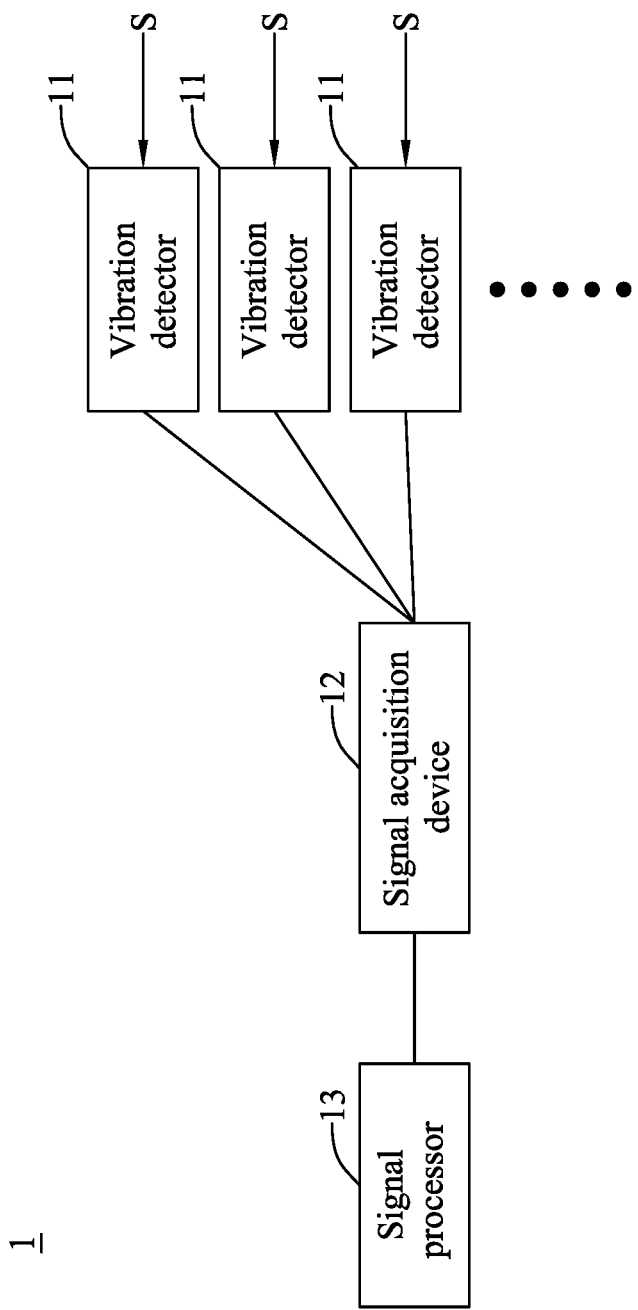
FIG. 1 is a block diagram of a device for monitoring healthy status of machinery mounts of a first embodiment in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a block diagram of a device for monitoring healthy status of machinery mounts of a first embodiment in accordance with the present disclosure. As shown in FIG. 1, the device 1 for monitoring healthy status of machinery mounts includes a plurality of vibration detectors 11, a signal acquisition device 12, and a signal processor 13.

The vibration detectors 11 can detect the vibration signals S from of a machine device after the machine device is excited, where the machine device may include a plurality of machinery mounts. In a preferred embodiment, the vibration detectors 11 may be accelerometers, or other similar devices, and the machine device may be a machine tool, or any one of the other kinds of machines with machinery mounts.

The signal acquisition device 12 can receive the vibration signals S of the vibration detectors 11. In a preferred embodiment, the signal acquisition device 12 may be a data acquisition card, or other similar devices.

The signal processor 13 can execute a modal frequency analysis process to analyze the vibration signals S of the vibration detectors 11. The modal frequency analysis process includes a transmissibility calculation process, a singular value decomposition process, a modal decision process, and a status diagnosis process. In a preferred embodiment, the signal processor 13 may be a central processing unit (CPU), or other similar devices.

First, the signal processor 13 executes the transmissibility calculation process to analyze the vibration signals S of the vibration detectors 11 by a power spectrum density function analysis process to calculate the ratio between the vibration signals S in order to obtain the transmissibilities of the vibration detectors 11.

Next, the signal processor 13 executes the singular value decomposition process to calculate the singular value of the transmissibility matrix composed of the transmissibilities of the vibration detectors 11 in order to calculate the natural frequency of the machinery mounts of the machine device in the current status according to the singular value.

Afterward, the signal processor 13 executes a modal decision process to calculate the vibration mode corresponding to the natural frequency of the machinery mounts in the current status so as to serve as a test mode. Finally, the signal processor 13 executes a modal diagnosis process to calculate the modal assurance criterion (MAC) between the test mode and a reference mode in order to determine the healthy status of the machinery mounts of the machine device. The above reference mode is the mode corresponding to the natural frequency of the machinery mounts of the machine device in the optimized status. If the modal assurance criterion is higher than a threshold, the signal processor 13 determines that the machinery mounts of the machine device are in the optimized status. On the contrary, if the modal assurance criterion is lower than the threshold, the signal processor 13 determines that the machinery mounts of the machine device are not in the optimized status. In a preferred embodiment, the healthy status of the machinery mounts of the machine device can be used to determine whether the joint stiffness between each machinery mount and the ground is sufficient or not.

The above threshold can be adjusted according to actual requirements. If the modal assurance criterion is 0~1, the above threshold can be defined to be 0.6~0.8. For example, the above threshold can be defined to be "modal assurance criterion $\geq 0.7$"; if the modal assurance criterion is higher than 0.7, the signal processor 13 determines that the machinery mounts of the machine device are in the optimized status; on the contrary, if the modal assurance criterion is lower than 0.7, the signal processor 13 determines that the machinery mounts of the machine device are not in the optimized status.

After the levelness of the machine device is adjusted to conform to the levelness standard value, the joint stiffness between some of the machinery mounts of the machine may and the ground may still be insufficient. Besides, the joint stiffness between the machinery mounts of the machine device and the ground may be changed because of collision, or other factors after the machine device has been used for a period of time. Therefore, the machinery mounts may not effectively support the machine device, so the machine device may abnormally vibrate during the machining process, which significantly influences the precision of the machine device.

However, in the embodiment, the device 1 for monitoring health status of machinery mounts can detect the vibration signals S from the machine device after the machine device is excited, and execute the modal frequency analysis process to analyze the vibration signals S. The change of the joint stiffness between the machinery mounts of the machine device and the ground influences the vibration modes of the machine device, including natural frequency, modal stiffness, modal damping, mode shape, etc. Thus, the modal frequency analysis process can effectively determine the healthy status of the machinery mounts of the machine device so as to effectively monitor whether the joint stiffness between each of the machinery mount and the ground is sufficient. Accordingly, the device 1 for monitoring health status of machinery mounts can effectively prevent from abnormal vibrations generated during the machining process of the machine device, so the precision of the machine device can be significantly increased.

Figure 2:
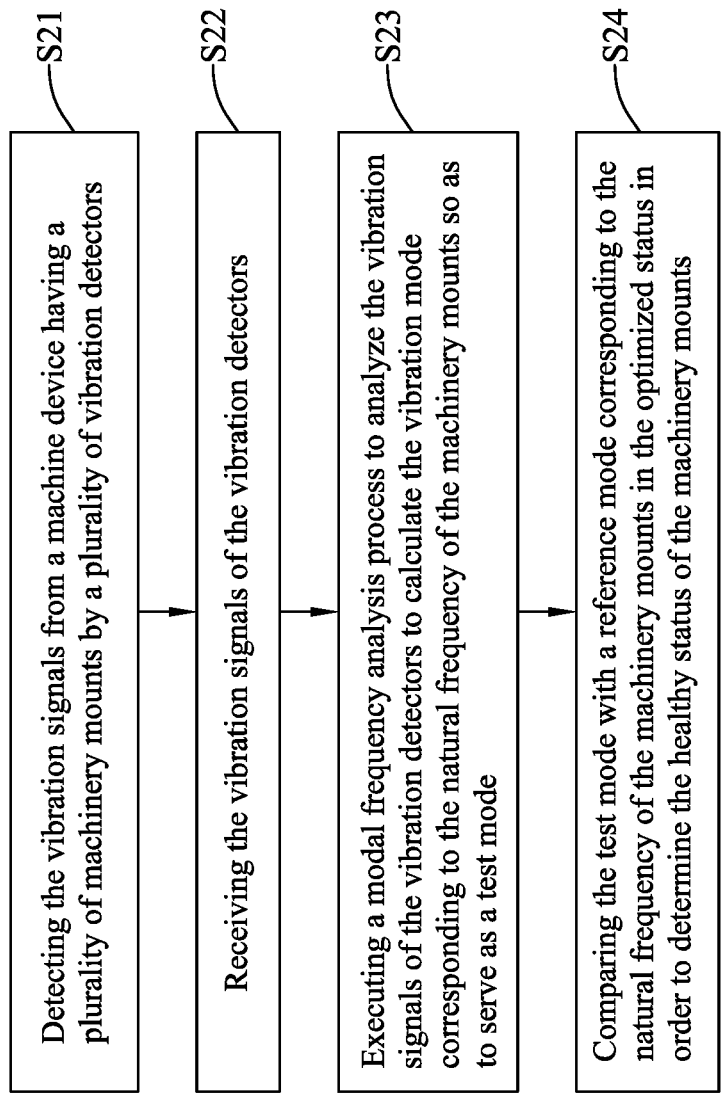
FIG. 2 is a flow chart of the first embodiment in accordance with the present disclosure.

FIG. 2 is a flow chart of the first embodiment in accordance with the present disclosure. As shown in FIG. 2, the method used by the device 1 for monitoring health status of machinery mounts according to the embodiment includes the following steps:

Step S21: Detecting the vibration signals from a machine device having a plurality of machinery mounts by a plurality of vibration detectors.

Step S22: Receiving the vibration signals of the vibration detectors.

Step S23: Executing a modal frequency analysis process to analyze the vibration signals of the vibration detectors to calculate the vibration mode corresponding to the natural frequency of the machinery mounts so as to serve as a test mode.

Step S24: Comparing the test mode with a reference mode corresponding to the natural frequency of the machinery mounts in the optimized status in order to determine the healthy status of the machinery mounts.

The embodiment just exemplifies the present disclosure and is not intended to limit the scope of the present disclosure. Any equivalent modification and variation according to the spirit of the present disclosure is to be also included within the scope of the following claims and their equivalents.

Figure 3:
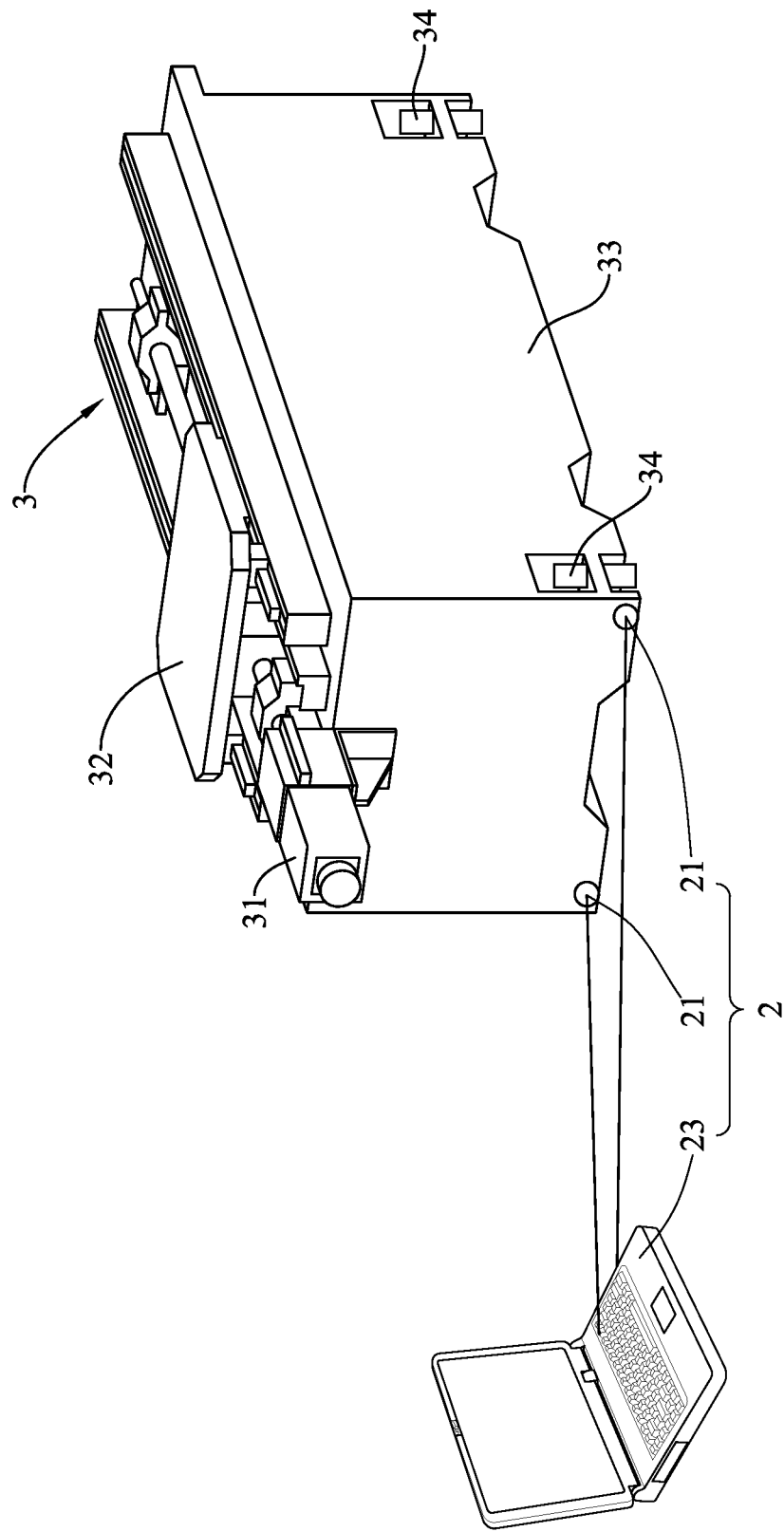
FIG. 3 is a first schematic diagram of a device for monitoring healthy status of machinery mounts of a second embodiment in accordance with the present disclosure.

FIG. 3 is a first schematic diagram of a device for monitoring healthy status of machinery mounts of a second embodiment in accordance with the present disclosure. As shown in FIG. 3, the device 2 for monitoring health status of machinery mounts includes a plurality of accelerometers 21 and a computer 23, and the computer 23 includes a data acquisition card (not shown in the drawings). The computer 23 saves the vibration mode corresponding to the natural frequency of the machinery mounts 34 in the optimized status (i.e. the status that the joint stiffness between all of the machinery mounts 34 and the ground has been adjusted to conform to the standard value) in advance in order to serve as the reference mode. The device 2 for monitoring health status of machinery mounts is connected to a machine tool 3, and the machine tool 3 includes a motor 31, a work table 32, a main body 33, and a plurality of machinery mounts 34, where the accelerometers 21 are disposed on the main body 33, and connected to the data acquisition card of the computer 23.

The accelerometers 21 can detect the vibration signals of the machine tool 3 after the machine tool 3 is excited, and the data acquisition card can receive the vibration signals of the accelerometers 21. Then, the computer 23 executes a modal frequency analysis process to analyze the vibration signals of the accelerometers 21. The modal frequency analysis process includes a transmissibility calculation process, a singular value decomposition process, a modal decision process, a status diagnosis process, etc.

First, the computer 23 executes the transmissibility calculation process to analyze the vibration signals of the accelerometers 21 by a power spectrum density function analysis process. Then, the computer 23 can calculate the ratio between vibration signals of the accelerometers 21 so as to obtain the transmissibilities of the accelerometers 21.

The transmissibility can be expressed by Equation (1), as follows:

$$T_{ij}(s) = \frac{G_{ij}(s)}{G_{jj}(s)} \quad (1)$$

In Equation (1), i and j stand for the accelerometers 21 installed at different positions respectively. $G_{jj}(s)$ is the auto-power spectrum density function of the vibration signal of the accelerometer 21 at the position j. $G_{ij}(s)$ is the cross-power spectrum density function of the vibration signals of the accelerometers 21 at the position i and the position j. For a system with N degree of freedom, $T_{ij}(s)$ in Equation (1) can be expressed by Equation (2), as follows:

$$T_{ij}(s) = \frac{\sum_{k=1}^{N} H_{ik}(s)F_k(s)}{\sum_{k=1}^{N} H_{jk}(s)F_k(s)} \quad (2)$$

In Equation (2), k stands for the excitations caused by different external forces. F stands for the applied external force. H stands for the transfer function (i.e. the frequency response function). The definition of H can be expressed by Equation (3), as follows:

$$H_{ik}(s) = \sum_{r=1}^{N} \left( \frac{\phi_{ir} L_{kr}}{i\omega - \lambda_r} + \frac{\phi_{ir}^* L_{kr}^*}{i\omega - \lambda_r^*} \right) \quad (3)$$

In Equation (3), $\phi$ stands for the modal vector. L stands for the modal participation. $\lambda$ stands for the poles of the system. When $i\omega$ is close to the poles of the system, the vibration resonance occurs. For the reason, Equation (2) can be further expressed by Equation (4), as follows:

$$\lim_{s \to \lambda_r} T_{ij}(s) = \frac{\sum_{k=1}^{N} \phi_{ir} L_{kr}}{\sum_{k=1}^{N} \phi_{jr} L_{kr}} = \frac{\phi_{ir}}{\phi_{jr}} \quad (4)$$

Equation (4) shows the relation between the transmissibility and the modal ratio when the vibration resonance occurs.

Then, the computer 23 executes the singular value decomposition process to calculate the singular value of the transmissibility matrix composed of the transmissibilities of the accelerometers 21 in order calculate the natural frequency of the machinery mounts 34 of the machine tool 3 in the current status according to the singular value.

The transmissbilities $T_{ij}$ in Equation (1) can be expressed as a vector $\varphi(s)$, as shown in Equation (5):

$$\varphi(s) = \begin{bmatrix} T_{1j}(s) \\ \vdots \\ T_{ij}(s) \\ \vdots \\ T_{Nj}(s) \end{bmatrix} \quad (5)$$

Afterward, the computer 23 executes normalization for $\varphi(s)$ in each frequency in order to obtain the pseudo modal vector $\psi(s)$. When the vibration resonance occurs, (i.e. s is close to $\lambda_r$), the pseudo modal vector is equal to the natural modal vector according to Equation (4). Then, a transmissibility matrix T can be obtained by combining $T_{ij}(s)$ generated by applying different external forces with one another, as shown in Equation (6), as follows:

$$T(s) = \begin{bmatrix} T_{12}^1(s) & T_{12}^2(s) & \cdots & T_{12}^k(s) \\ T_{13}^1(s) & T_{13}^2(s) & & T_{13}^k(s) \\ \vdots & \vdots & \cdots & \vdots \\ T_{ij}^1(s) & T_{ij}^2(s) & \cdots & T_{ij}^k(s) \\ 1 & 1 & & 1 \end{bmatrix} \quad (6)$$

The computer 23 can decompose Equation (6) by using the singular value decomposition, as shown in Equation (7), as follows:

$$T(s) = U(s)\Sigma(s)V^T(s) \quad (7)$$

In Equation (7), U and V are unit orthogonal matrixes, and $\Sigma$ is a diagonal matrix, which can be further expressed by Equation (8), as follows:

$$\Sigma(s) = \begin{bmatrix} \sigma_1(s) & 0 & \cdots & 0 \\ 0 & \sigma_2(s) & & 0 \\ \vdots & \vdots & \ddots & \vdots \\ 0 & \cdots & \cdots & \sigma_{1k}(s) \end{bmatrix} \quad (8)$$

In Equation (8), the elements along the diagonal are the singular value of the transmissibility matrix T. The natural frequency is just the frequency corresponding to the peak value of the curve obtained by calculating the reciprocal of $\sigma_2$ in Equation (8).

Next, the computer 23 executes the modal decision process to calculate the vibration mode corresponding to the natural frequency of the machinery mounts 34 of the machine tool 3 in order to serve as the test mode.

Finally, the computer 23 executes the status diagnosis process to calculate the modal assurance criterion (MAC) between the test mode and the reference mode in order to determine the healthy status of the machinery mounts 34. The modal assurance criterion can be expressed by Equation (9), as follows:

$$M = \frac{(\theta_t^T \theta_r)^2}{(\theta_t^T \theta_t)(\theta_r^T \theta_r)} \quad (9)$$

In Equation (9), $\theta_r$ is the reference mode. $\theta_t$ is the test mode. M stands for the modal assurance criterion; the modal assurance criterion is 0~1, as shown in Equation (10), as follows:

$$0 \leq M \leq 1 \quad (10)$$

In the embodiment, the threshold is "modal assurance criterion M=0.7". If the modal assurance criterion M is higher than the threshold, the computer 23 determines that the machinery mounts 34 of the machine tool 3 are in the optimized status. On the contrary, if the modal assurance criterion M is lower than the threshold, the computer 23 determines that the machinery mounts 34 of the machine tool 3 are not in the optimized status.

The reference mode and the test mode can include several modes respectively. In general, it can obtain a precise result just by comparing the first six modes of the reference modes with the first six modes of the test modes. In the embodiment, the computer 23 compare the first four modes of the reference modes with the first four modes of the test modes, and uses "modal assurance criterion M=0.7" to serve as the threshold. If the modal assurance criterion M is higher than the threshold, the computer 23 determines that the machinery mounts 34 of the machine tool 3 are in the optimized status; in other words, the joint stiffness between all of the machinery mounts 34 of the machine tool 3 and the ground conforms to the standard value. On the contrary, if the modal assurance criterion M is lower than the threshold, the computer 23 determines that the machinery mounts 34 of the machine tool 3 are not in the optimized status; in other words, the joint stiffness between some of the machinery mounts 34 of the machine tool 3 and the ground fails to conform to the standard value.

Figure 4:
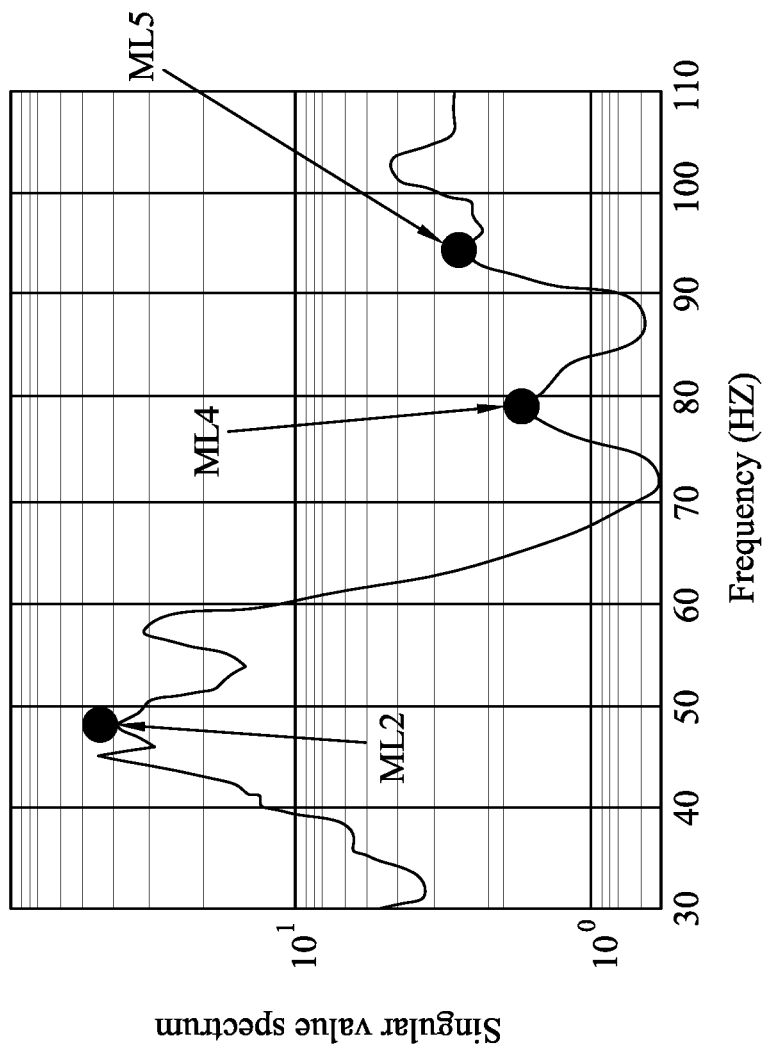
FIG. 4 is a second schematic diagram of the second embodiment in accordance with the present disclosure.
Figure 5:
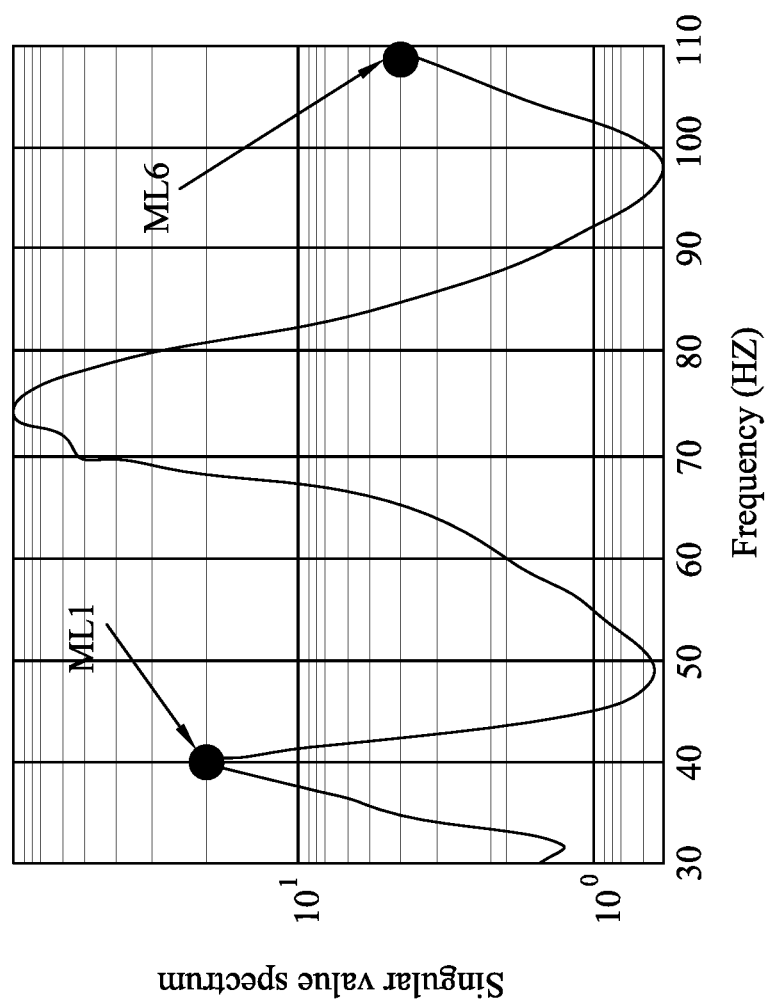
FIG. 5 is a third schematic diagram of the second embodiment in accordance with the present disclosure.
Figure 6:
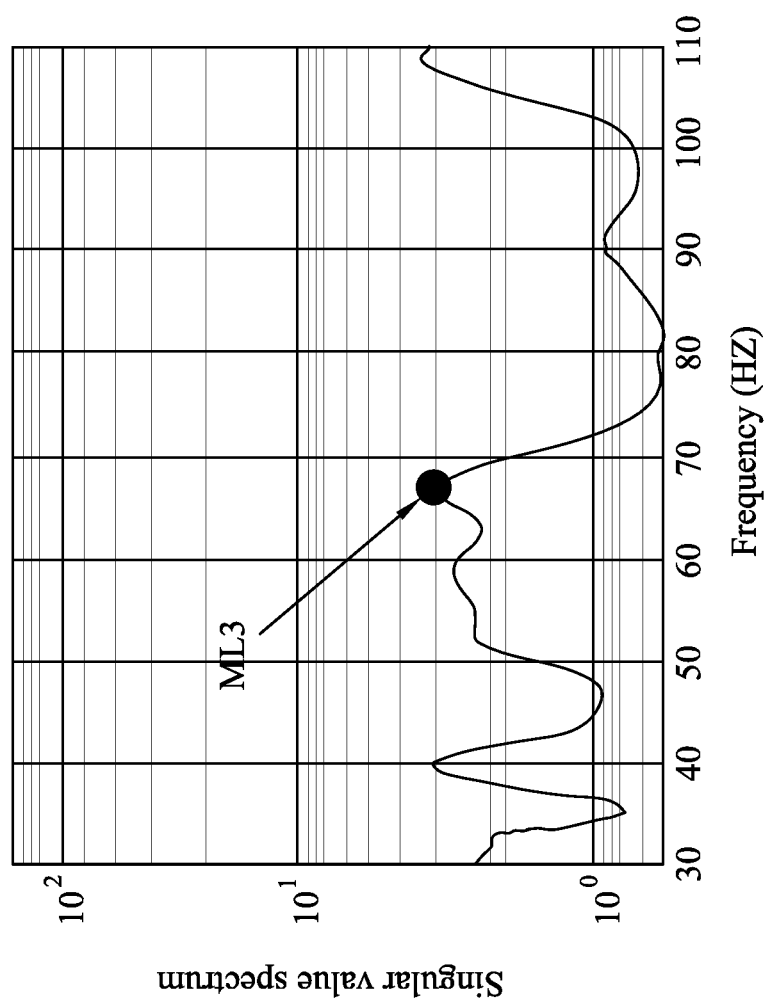
FIG. 6 is a fourth schematic diagram of the second embodiment in accordance with the present disclosure.

FIG. 4, FIG. 5, and FIG. 6 are second~fourth schematic diagrams of the second embodiment in accordance with the present disclosure.

FIG. 4 shows the reference mode in the X direction obtained by exciting the machine tool 3, which includes a second mode ML2, a fourth mode ML4, and a fifth mode ML5.

FIG. 5 shows the reference mode in the Y direction obtained by exciting the machine tool 3, which includes a first mode ML1 and a sixth mode ML6.

FIG. 6 shows the reference mode in the Z direction obtained by exciting the machine tool 3, which includes a third mode ML3.

As described above, the computer 23 compare the first four mode of the reference modes with the first four mode of the test modes, and uses "modal assurance criterion M=0.7" to serve as the threshold. If all of the machinery mounts 34 of the machine tool 3 have been correctly calibrated, and the joint stiffness between all of the machinery mounts 34 of the machine tool 3 conforms to the standard value, the modal assurance criterion M between the reference mode and the test mode should be higher than 0.7, as shown in Table (1), as follows:

TABLE 1

| | Modal assurance criterion M | | | |
|---|---|---|---|---|
| | Mode | | | |
| Direction | 1 | 2 | 3 | 4 |
| X | 0.9 | 0.9 | 0.9 | 0.9 |
| Y | 0.9 | 0.9 | 0.9 | 0.9 |
| Z | 0.9 | 0.9 | 0.9 | 0.9 |

Figure 7:
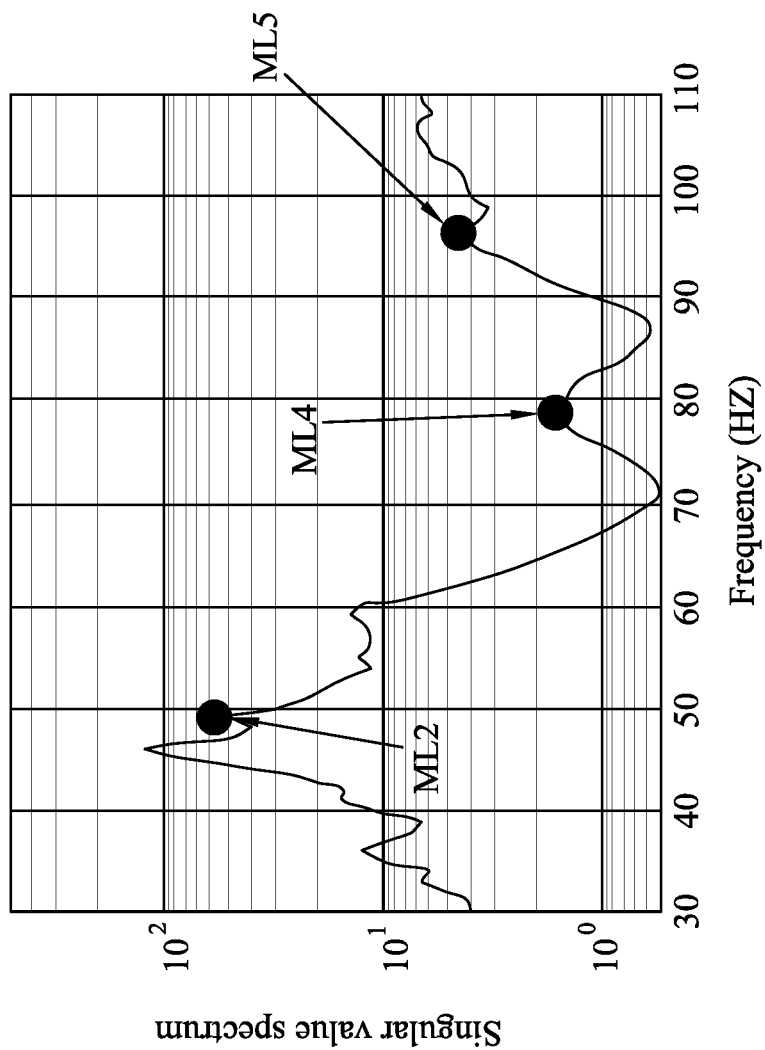
FIG. 7 is a fifth schematic diagram of the second embodiment in accordance with the present disclosure.
Figure 8:
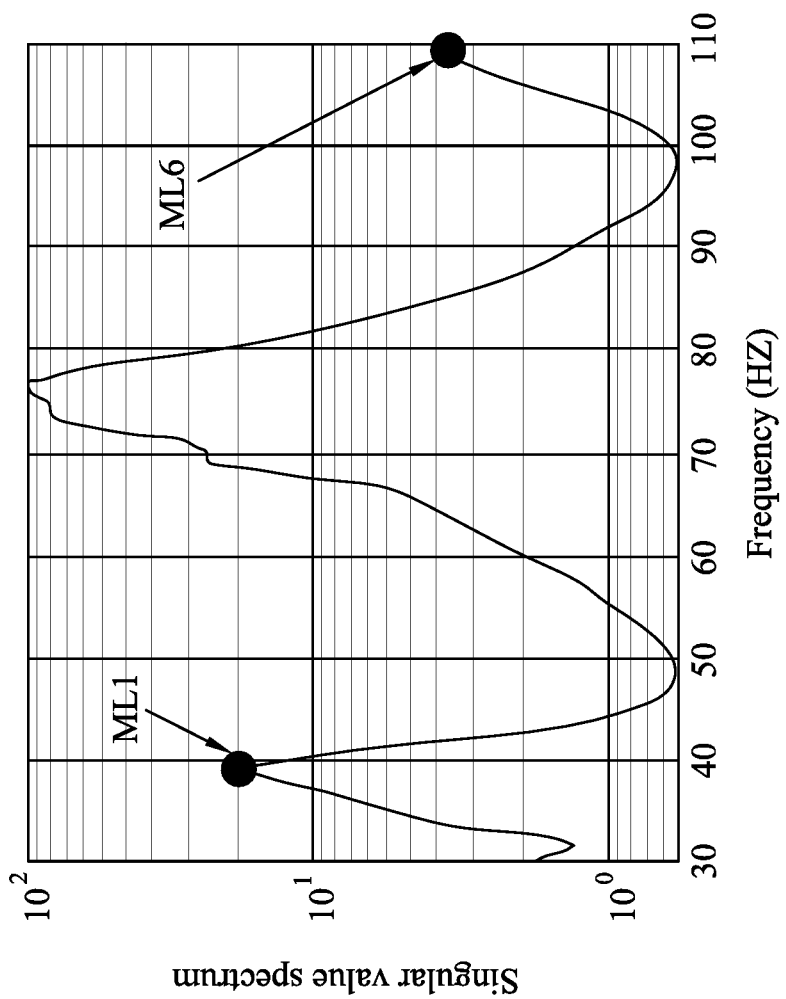
FIG. 8 is a sixth schematic diagram of the second embodiment in accordance with the present disclosure.
Figure 9:
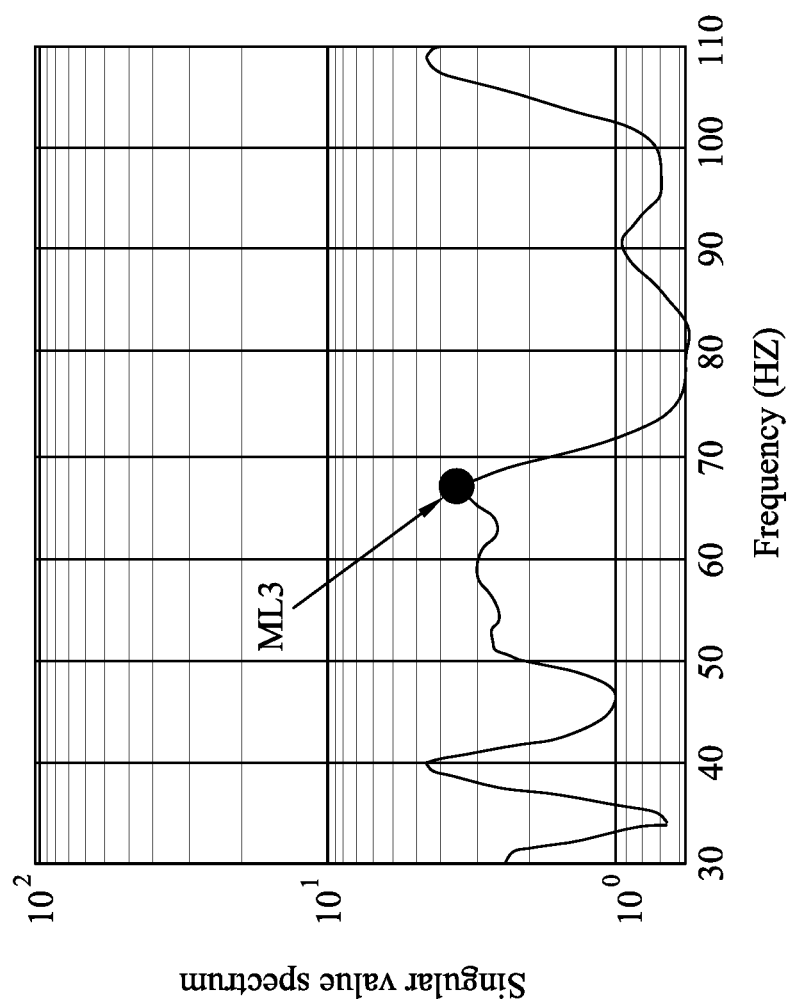
FIG. 9 is a seventh schematic diagram of the second embodiment in accordance with the present disclosure.

FIG. 7, FIG. 8, and FIG. 9 are fifth~seventh schematic diagrams of the second embodiment in accordance with the present disclosure.

FIG. 7 shows the test mode in the X direction obtained by exciting the machine tool 3, which includes a second mode ML2, a fourth mode ML4, and a fifth mode ML5.

FIG. 8 shows the test mode in the Y direction obtained by exciting the machine tool 3, which includes a first mode ML1 and a sixth mode ML6.

FIG. 9 shows the test mode in the Z direction obtained by exciting the machine tool 3, which includes a third mode ML3.

The joint stiffness between the machinery mounts 34 of the machine tool 3 and the ground may be changed because of collision, or other factors after the machine tool 3 has been used for a period of time. Therefore, the modal assurance criterion M between the reference mode and the test mode may be decreased, as shown in Table (2), as follows:

TABLE 2

| | Modal assurance criterion M | | | |
|---|---|---|---|---|
| | Mode | | | |
| Direction | 1 | 2 | 3 | 4 |
| X | 0.4 | 0.99 | 0.9 | 0.9 |
| Y | 0.9 | 0.4 | 0.9 | 0.9 |
| Z | 0.9 | 0.9 | 0.9 | 0.9 |

If the above situation occurs, the user can properly adjust the machinery mounts 34 of the machine tool 3, and then repeat the above steps in order to determine the healthy status of the machinery mounts 34 of the machine tool 3.

As described above, the device 2 for monitoring health status of machinery mounts can accurately determine the healthy status of the machinery mounts 34 of the machine tool 3, so can effectively monitor whether the joint stiffness between each machinery mount 34 and the ground is sufficient. Thus, the device 2 for monitoring health status of machinery mounts can effectively prevent from abnormal vibrations during the machining process of the machine tool 3, so the precision of the machine tool 3 can be significantly increased.

It is worthy to point out that there is no an effective method for monitoring the healthy status of the machinery mounts of a machine device so as to overcome the problem that the joint stiffness between the machinery mounts of the machine device and the ground is insufficient. Therefore, abnormal vibrations may be incurred during the machining process of the machine device, which will decrease the precision of the finished products. On the contrary, according to one embodiment of the present disclosure, the device for monitoring healthy status of machinery mounts can execute the modal frequency analysis process to determine the healthy status of the machinery mounts of the machine device, so can effectively monitor whether the joint stiffness between each machinery mount and the ground is enough. Thus, the device for monitoring healthy status of machinery mounts can effective prevent from the abnormal vibrations generated during the machining process of the machine device, so the precision of the machine device can be significantly increased.

Also, according to one embodiment of the present disclosure, the device for monitoring healthy status of machinery mounts can detect the vibration signals from the machine device after the machine is excited, so the vibration signals can be more precise. Therefore, the device for monitoring healthy status of machinery mounts can precisely estimate the change of modes of the machinery mounts, which can significantly increase its precision.

Further, according to one embodiment of the present disclosure, the device for monitoring healthy status of machinery mounts can swiftly determine the healthy status of the machinery mounts, so the user can efficiently adjust or replace the machinery mounts of the machine device, which is more conveniently in use.

Moreover, according to one embodiment of the present disclosure, the device for monitoring healthy status of machinery mounts can monitor not only the healthy status of the machinery mounts of the machine tool, but also can monitor the healthy status of the machinery mounts of the other kinds of machines, so its application can be more comprehensive.

Furthermore, according to one embodiment of the present disclosure, the device for monitoring healthy status of machinery mounts can be directly integrated with the machine device, so the machine device can provide the function for monitoring the healthy status. Therefore, the commercial value of the machine device can be increased. Accordingly, the device for monitoring healthy status of machinery mounts definitely has an inventive step.

Figure 10A:
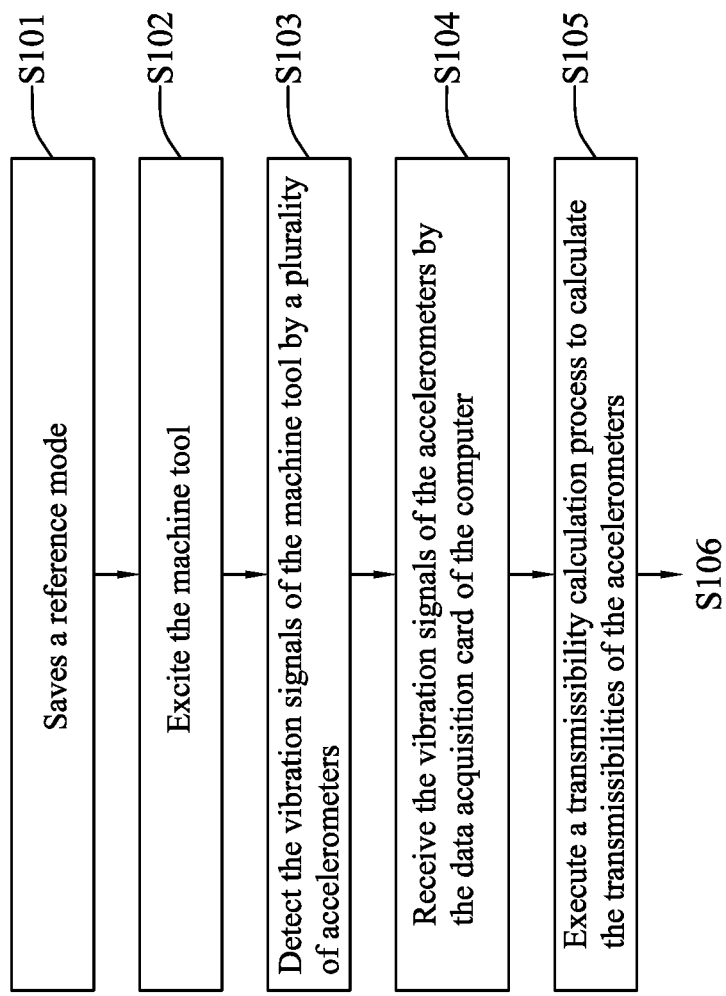
FIG. 10A is a first flow chart of the second embodiment in accordance with the present disclosure.
Figure 10B:
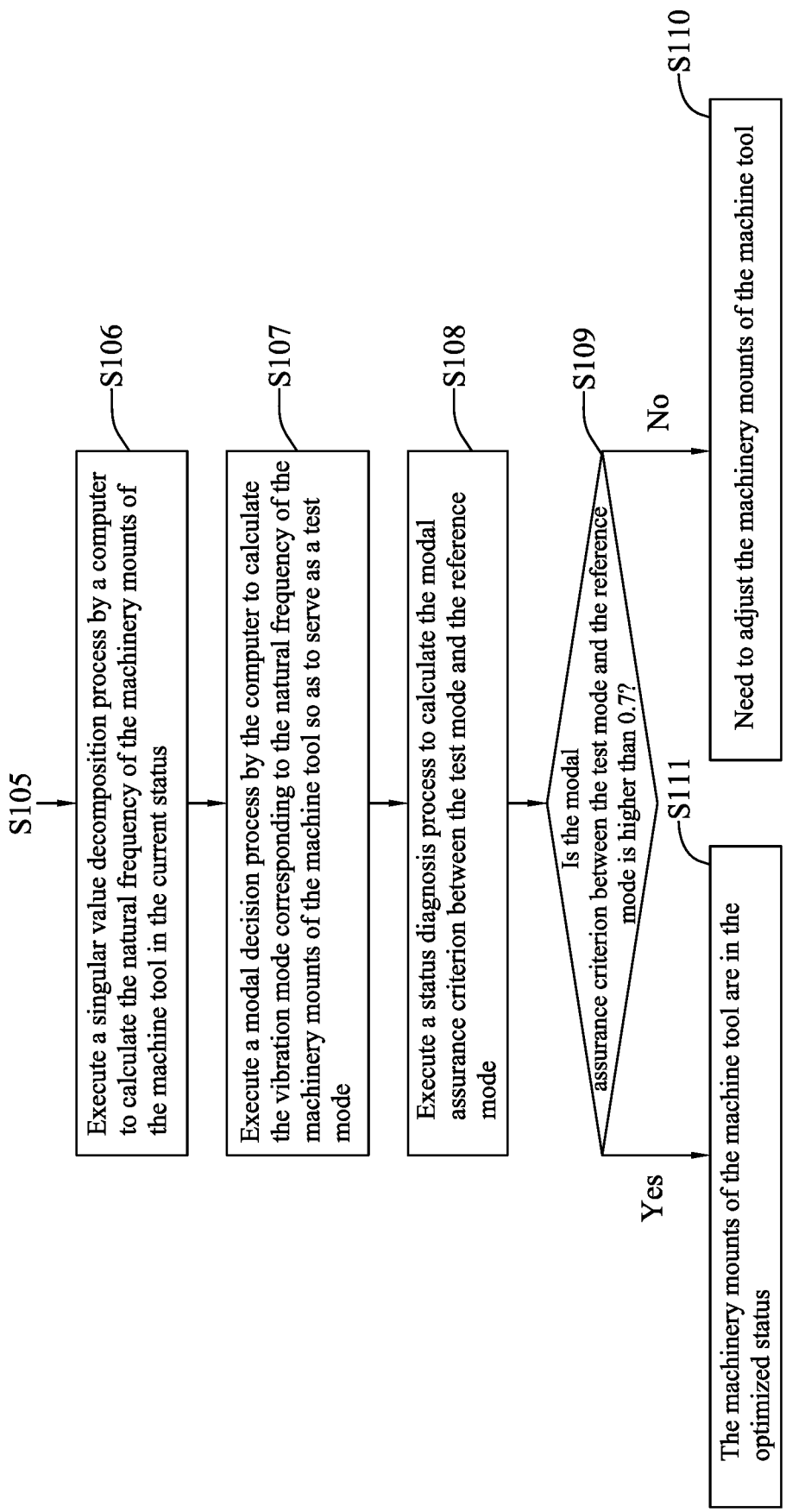
FIG. 10B is a second flow chart of the second embodiment in accordance with the present disclosure.

FIG. 10A and FIG. 10B are first~second flow charts of the second embodiment in accordance with the present disclosure. As shown in FIG. 10A and FIG. 10B, the method used by the device 2 for monitoring health status of machinery mounts according to the embodiment includes the following steps:

Step S101: Saves a reference mode by a computer; then, the process proceeds to Step S102.

Step S102: Excite the machine tool; then, the process proceeds to Step S103.

Step S103: Detect the vibration signals of the machine tool by a plurality of accelerometers; then, the process proceeds to Step S104.

Step S104: Receive the vibration signals of the accelerometers by the data acquisition card of the computer; then, the process proceeds to Step S105.

Step S105: Execute a transmissibility calculation process by the computer to calculate the transmissibilities of the accelerometers; then, the process proceeds to Step S106.

Step S106: Execute a singular value decomposition process by a computer to calculate the natural frequency of the machinery mounts of the machine tool in the current status; then, the process proceeds to Step S107.

Step S107: Execute a modal decision process by the computer to calculate the vibration mode corresponding to the natural frequency of the machinery mounts of the machine tool so as to serve as a test mode; then, the process proceeds to Step S108.

Step S108: Execute a status diagnosis process by the computer to calculate the modal assurance criterion between the test mode and the reference mode; then, the process proceeds to Step S109.

Step S109: Determine whether the modal assurance criterion between the test mode and the reference mode is higher than 0.7 by the computer; if it is, the process proceeds to Step S111; if it is not, the process proceeds to Step S110.

Step S110: The user adjusts the machinery mounts of the machine tool.

Step S111: The computer determines that the machinery mounts of the machine tool are in the optimized status.

The embodiment just exemplifies the present disclosure and is not intended to limit the scope of the present disclosure. Any equivalent modification and variation according to the spirit of the present disclosure is to be also included within the scope of the following claims and their equivalents.

In summation of the description above, according to one embodiment of the present disclosure, the device for monitoring healthy status of machinery mounts can execute the modal frequency analysis process to determine the healthy status of the machinery mounts of the machine device, so can effectively monitor whether the joint stiffness between each machinery mount and the ground is enough. Thus, the device for monitoring healthy status of machinery mounts can effective prevent from the abnormal vibrations generated during the machining process of the machine device, so the precision of the machine device can be significantly increased.

Also, according to one embodiment of the present disclosure, the device for monitoring healthy status of machinery mounts can detect the vibration signals from the machine device after the machine is excited, so the vibration signals can be more precise. Therefore, the device for monitoring healthy status of machinery mounts can precisely estimate the change of modes of the machinery mounts, which can significantly increase its precision.

Further, according to one embodiment of the present disclosure, the device for monitoring healthy status of machinery mounts can swiftly determine the healthy status of the machinery mounts, so the user can efficiently adjust or replace the machinery mounts of the machine device, which is more conveniently in use.

Moreover, according to one embodiment of the present disclosure, the device for monitoring healthy status of machinery mounts can monitor not only the healthy status of the machinery mounts of the machine tool, but also can monitor the healthy status of the machinery mounts of the other kinds of machines, so its application can be more comprehensive.

Furthermore, according to one embodiment of the present disclosure, the device for monitoring healthy status of machinery mounts can be directly integrated with the machine device, so the machine device can provide the function for monitoring the healthy status. Therefore, the commercial value of the machine device can be increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A device for monitoring healthy status of machinery mounts, comprising:

a plurality of vibration detectors, configured to detect vibration signals from of a machine device having a plurality of machinery mounts;

a signal acquisition device, configured to receive the vibration signals of the vibration detectors; and a signal processor, configured to execute a modal frequency analysis process to analyze the vibration signals of the vibration detectors, wherein the signal processor calculates a vibration mode corresponding to a natural frequency of the machinery mounts in a current status to serve as a test mode, and compares the test mode with a reference mode corresponding to a natural frequency of the machinery mounts in an optimized status in order to determine a healthy status of the machinery mounts;

wherein the healthy status of the machinery mounts stands for a joint stiffness between the machinery mounts and a ground.

2. The device for monitoring healthy status of machinery mounts of claim 1, wherein the vibration detectors detect the vibration signals from the machine device after the machine device is excited.

3. The device for monitoring healthy status of machinery mounts of claim 1, wherein the vibration detectors are accelerometers.

4. The device for monitoring healthy status of machinery mounts of claim 1, wherein the signal processor executes a transmissibility calculation process in order to calculate a transmissibility of the vibration detectors.

5. The device for monitoring healthy status of machinery mounts of claim 4, wherein the signal processor calculates the transmissibility of the vibration detectors according to the vibration signals of the vibration detectors.

6. The device for monitoring healthy status of machinery mounts of claim 5, wherein the signal processor executes a power spectrum density function analysis process to calculate a ratio between the vibration signals of the vibration detectors in order to obtain the transmissibility of the vibration detectors.

7. The device for monitoring healthy status of machinery mounts of claim 4, wherein the signal processor executes a singular value decomposition process to calculate a singular value of a transmissibility matrix composed of the transmissibilities of the vibration detectors in order to calculate the natural frequency of the machinery mounts in the current status according to the singular value.

8. The device for monitoring healthy status of machinery mounts of claim 7, wherein the signal processor executes a status diagnosis process in order to calculate a modal assurance criterion between the reference mode and the test mode.

9. The device for monitoring healthy status of machinery mounts of claim 8, wherein when the modal assurance criterion is higher than a threshold, the signal processor determines that the machine mounts are in the optimized status.

10. The device for monitoring healthy status of machinery mounts of claim 9, wherein when the modal assurance criterion is lower than a threshold, the signal processor determines that the machine mounts are not in the optimized status.

11. A method for monitoring healthy status of machinery mounts, comprising following steps:

detecting vibration signals from a machine device having a plurality of machinery mounts by a plurality of vibration detectors;

receiving the vibration signals of the vibration detectors;

executing a modal frequency analysis process to analyze the vibration signals of the vibration detectors to calculate a vibration mode corresponding to a natural frequency of the machinery mounts to serve as a test mode; and comparing the test mode with a reference mode corresponding to a natural frequency of the machinery mounts in an optimized status in order to determine a healthy status of the machinery mounts, wherein the healthy status of the machinery mounts stands for a joint stiffness between the machinery mounts and a ground.

12. The method for monitoring healthy status of machinery mounts of claim 11, wherein a step of detecting the vibration signals from the machine device by a plurality of the vibration detectors further comprises a following step:

exciting the machine device.

13. The method for monitoring healthy status of machinery mounts of claim 11, wherein a step of executing the modal frequency analysis process to analyze the vibration signals of the vibration detectors to calculate the vibration mode corresponding to the natural frequency of the machinery mounts to serve as the test mode further comprises a following step:

executing a transmissibility calculation process in order to calculate a transmissibility of the vibration detectors.

14. The method for monitoring healthy status of machinery mounts of claim 13, wherein a step of executing the transmissibility calculation process to calculate the transmissibility of the vibration detectors further comprises a following step:

executing a power spectrum density function analysis process to calculate a ratio between the vibration signals of the vibration detectors in order to obtain the transmissibility of the vibration detectors.

15. The method for monitoring healthy status of machinery mounts of claim 13, wherein the step of executing the modal frequency analysis process to analyze the vibration signals of the vibration detectors to calculate the vibration mode corresponding to the natural frequency of the machinery mounts to serve as the test mode further comprises a following step:

executing a singular value decomposition process to calculate a singular value of a transmissibility matrix composed of the transmissibilities of the vibration detectors in order to calculate the natural frequency of the machinery mounts in the current status according to the singular value.

16. The method for monitoring healthy status of machinery mounts of claim 15, wherein a step of comparing the test mode with the reference mode corresponding to the natural frequency of the machinery mounts in the optimized status in order to determine the healthy status of the machinery mounts further comprises a following step:

executing a status diagnosis process to calculate a modal assurance criterion between the reference mode and the test mode.

17. The method for monitoring healthy status of machinery mounts of claim 16, wherein the step of comparing the test mode with the reference mode corresponding to the natural frequency of the machinery mounts in the optimized status in order to determine the healthy status of the machinery mounts further comprises a following step:

determining that the machine mounts are in the optimized status when the modal assurance criterion is higher than a threshold.

18. The method for monitoring healthy status of machinery mounts of claim 17, wherein the step of comparing the test mode with the reference mode corresponding to the natural frequency of the machinery mounts in the optimized status in order to determine the healthy status of the machinery mounts further comprises a following step:

determining that the machine mounts are not in the optimized status when the modal assurance criterion is lower than the threshold.

* * * * *